US010058873B1

(12) United States Patent
Barber

(10) Patent No.: US 10,058,873 B1
(45) Date of Patent: Aug. 28, 2018

(54) PROCESS FOR SAFE DECONSTRUCTION AND RECYCLING OF CATALYTIC CONVERTERS

(71) Applicant: Michael D Barber, Loma LInda, CA (US)

(72) Inventor: Michael D Barber, Loma LInda, CA (US)

( * ) Notice: Subject to any disclaimer, the term of this patent is extended or adjusted under 35 U.S.C. 154(b) by 164 days.

(21) Appl. No.: 14/999,486

(22) Filed: May 11, 2016

(51) Int. Cl.
B02C 23/00 (2006.01)
B02C 23/08 (2006.01)
F01N 3/00 (2006.01)

(52) U.S. Cl.
CPC ............ B02C 23/08 (2013.01); F01N 3/00 (2013.01)

(58) Field of Classification Search
USPC ............ 588/300; 241/24; 29/890.1, 402.03
See application file for complete search history.

(56) References Cited

U.S. PATENT DOCUMENTS

| 4,074,865 | A | * | 2/1978 | Gibbon | C22L 37/00 209/133 |
| 4,337,085 | A | * | 6/1982 | Cichy | C22B 11/026 75/10.65 |
| 5,279,464 | A | * | 1/1994 | Giegerich | B01J 23/96 241/19 |
| 5,325,795 | A | * | 7/1994 | Nelson | B09C 1/06 110/204 |
| 5,630,554 | A | * | 5/1997 | Izumikawa | B03B 9/061 241/24.13 |
| 2004/0153764 | A1 | * | 8/2004 | Paradkar | G06F 11/0748 714/18 |
| 2004/0156764 | A1 | * | 8/2004 | Soe | C22B 7/009 423/22 |
| 2007/0006438 | A1 | * | 1/2007 | Loiola | F01N 3/28 29/402.03 |
| 2007/0202025 | A1 | * | 8/2007 | Deplano | C22L 33/0005 423/22 |
| 2009/0277881 | A1 | * | 11/2009 | Bornemann | B23K 9/013 219/121.39 |
| 2010/0050598 | A1 | * | 3/2010 | Plati | B01D 53/9454 60/274 |
| 2016/0045841 | A1 | * | 2/2016 | Kaplan | B01J 19/0093 429/49 |

* cited by examiner

Primary Examiner — Nina Bhat
(74) Attorney, Agent, or Firm — Kirk A. Buhler; Buhler & Associates

(57) ABSTRACT

Systems and methods related to the recycling of spent or used catalytic converters are described. The system and method utilizes a crusher tube and grinder, and eliminates the alligator and guillotine shears used by industry. These improvements enhance the safety of the workers and removes occupational hazards such as dust and toxic contamination.

20 Claims, 3 Drawing Sheets

PROCESS FOR SAFE DECONSTRUCTION AND RECYCLING OF CATALYTIC CONVERTERS

CROSS REFERENCE TO RELATED APPLICATIONS

This application claims priority to U.S. Provisional Application having Ser. No. 62/230,010 filed May 11, 2015, which is hereby incorporated by reference in its entirety.

BACKGROUND

Catalytic converters are commonly installed in road vehicles and airplanes to control exhaust gas emissions by converting toxic gases to less toxic pollutants using accelerated (catalytic) chemical reactions. Once the catalytic activity of the converter deteriorates or has been damaged as a result of accident or for any other reason, the converter can be recycled. Catalytic converter recycling has been around since the 1970's and the industry still flourishes today.

The current way to process spent or damaged catalytic converters is through the use of equipment to slice or shear the outer metallic or ceramic housing of the converter. The shears are usually guillotine and alligator types, which pose great occupational risk to workers in the industry. Additionally, the process is usually carried out in open-aired rooms, with or without limited fume extractors (vacuums), thereby exposing workers and the facility to toxic dust and fumes that are generated during the recycling process.

After the housing is cut and removed, this provides access to the inner support material, which acts a carrier for the catalytic agents. These agents typically employ precious group metals such as platinum, palladium, and rhodium. The carrier can be of two types: ceramic or metal sheet (foil-like). Both types of carriers have a washcoat applied to the precious metals. There are several ways to recover the precious metals. One such method is U.S. Pat. No. 5,279,464. This scheme mechanically comminutes the entire catalytic converter into particles to form a mixture comprising fractions of the metallic housing, the carrier, and the catalyst. These fractions are then segregated on the basis of different characteristics using pneumatic classifiers, magnetic separators, and filters. The scheme is specifically designed for recycling catalytic converters with metallic or foil carriers, commonly known as metallic converters.

The present invention does not involve comminuting or grinding the entire metallic converter. It does not require pneumatic or magnetic separation. Additionally, it can be used for recycling ceramic converters.

TECHNICAL FIELD

The present invention relates to the recycling of spent or damaged catalytic converters. More specifically, the present invention recycles catalytic converters with minimum exposure of (a) workers to current occupational hazards (b) the facility and environment to toxic dust or emissions generated during the recycling process.

SUMMARY OF INVENTION

An object of the invention is to provide a method which renders it possible to recycle spent or damaged catalytic converters without the use of guillotine and alligator type shears. This in turn leads to a simpler and safer process.

Another object of the invention is to provide a method which does not involve any preliminary treatment, including chemical treatment of the converters.

An additional object of the invention is to provide a method which renders a safe working environment by enclosing certain work areas in the recycling operation.

Still another object of the invention is to provide a method for recycling the major components of the catalytic converter such as the metal housing, insulation, and wire mesh used in wrapping ceramic type catalyst.

Another object of the invention is to provide a method which will enable the scrap recyclers to receive the recycled components of the catalytic converter that is free from dust and residue.

The above advantages and features of the present description will be readily apparent from the following Detailed Description when taken alone or in connection with the accompanying drawings.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages above or in any part of this disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
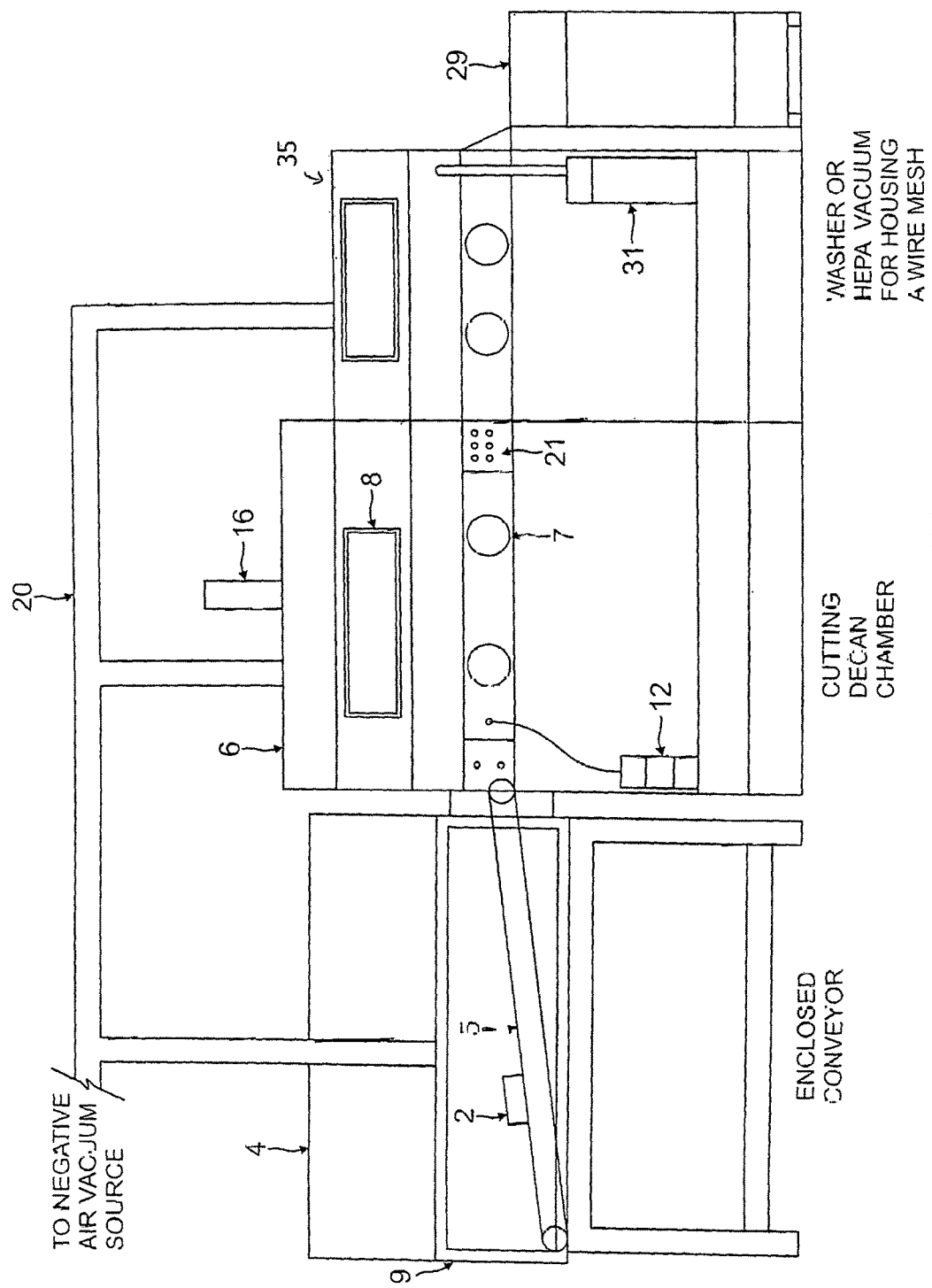
FIG. 1 is a block diagram of an implementation comprising a front view of the enclosed conveyor (left), the cutting and pulverizer cabinet (center), and the vacuum cleaning cabinet (right), in accordance with some embodiments disclosed herein.

The present description relates to systems and methods for catalytic converter deconstruction. In one non-limiting example, the invention may be configured as illustrated in FIG. 1. To begin the operator places scrap catalytic converters previously trimmed of excess tail pipe(s) bolts and hardware, which have been removed and placed in a container to be shipped to a scrap recycler. The operator loads the trimmed converters on conveyor 5 inside enclosed cabinet 9. The operator turns on the negative air vacuum source (and filter), creating a vacuum or negative air vacuum in enclosed cabinets 9, 6, 25, and 35. The operator inserts his hands into cabinet 6 using the attached gloves 7 in cabinet 6, which allows freedom of movement to work with his hands in an enclosed cabinet. Conveyor 5 is activated by foot or button control and the front converter on the conveyor 5 now moves into enclosed cabinet 6 through opening 10. With the converter 2 now inside cabinet 6 and in front of the operator, the operator looks through viewable glass 6. With his hands inside attached gloves 7, the operator uses plasma cutter gun 11 connected to the plasma cutter 12 to cut open the converter's steel housing. When the housing is sufficiently cut, the catalyst inside becomes exposed. The catalyst is removed and the cloth type insulation, if found, is removed and placed in a container already inside enclosed cabinet 6 to be later shipped to a recycler. A person of ordinary skill in the art should appreciate that these functions may be integrated or may be separate, depending on design and implementation considerations.

Figure 2:
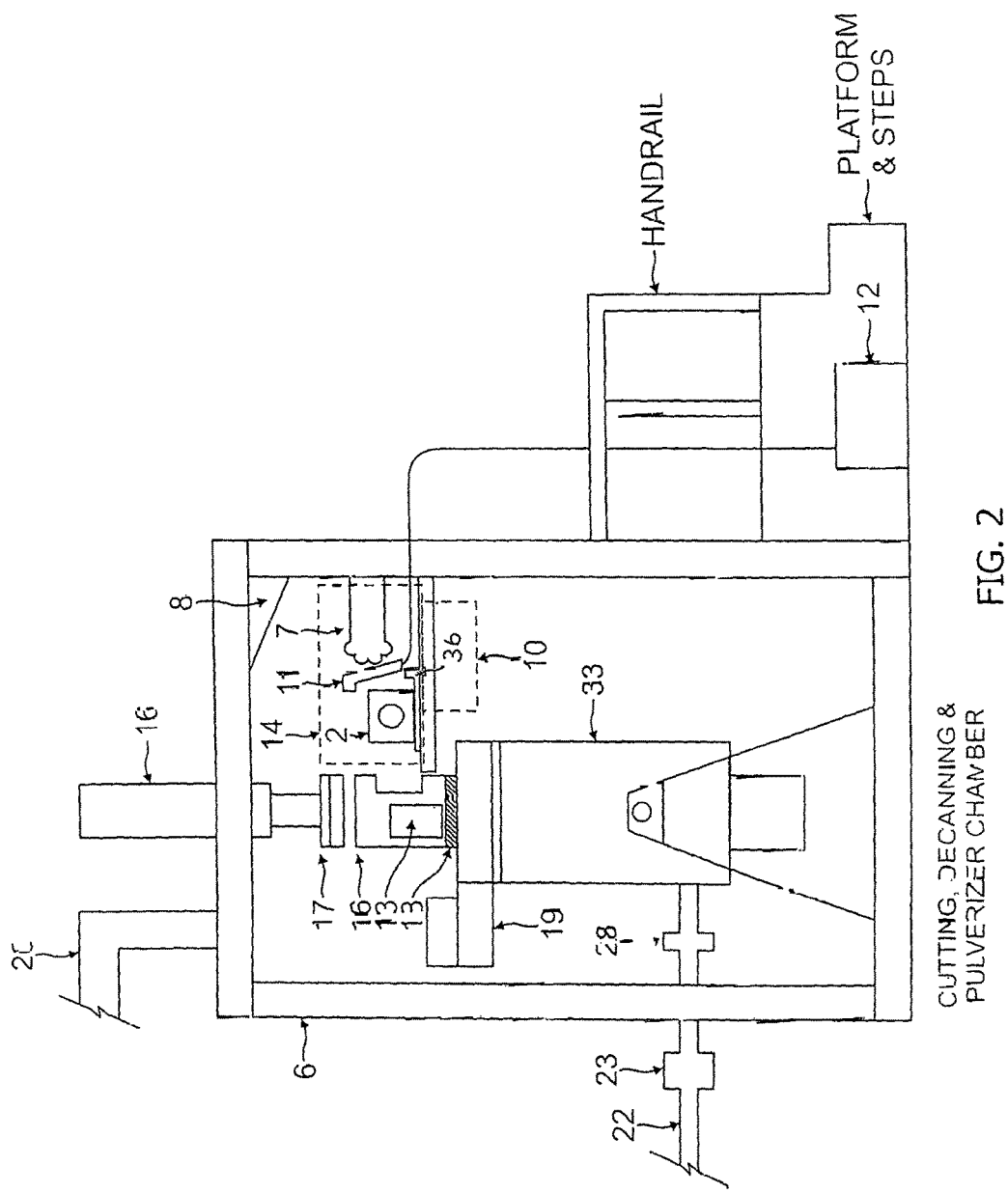
FIG. 2 is a block diagram of an implementation comprising the side view of cutting cabinet and the opening to the adjacent high-efficiency particulate air (HEPA) vacuum cleaning cabinet, in accordance with some embodiments disclosed herein.

FIG. 2 Illustrates the side view of the cutting and decanning cabinet, and the opening to the adjacent HEPA vacuum cleaning cabinet. Once the catalyst is separated from the metal housing of the converter, it is placed on a sliding tray 36 that is mounted on the shelf floor. The catalytic material is then pushed on the tray into the mouth of crusher tube 16. Once deposited in the tube, the operator activates the crusher tube cylinder 16 and the attached piston 17, which is inside the tube, lowers onto the top of the catalytic material and forces it through grate 18 located at the bottom of tube 16. As the catalyst passes through the grate, it splinters into smaller pieces that are approximately one to two inches in diameter. As the material is pushed through grate 18, it falls through open gate valve 19 and into pulverizer 33. The pulverizer can be of the knife or chain cutting variety and any suitable type catalyst material is fed through the crusher tube until the pulverizer is full. The next step begins with the operator closing gate valve 19 and pulverizer 33 is activated and grinds the catalytic material into powder. The powder size is determined by the pulverizer run time and the plant's powder size requirements. The crushing tube and pulverizer are all housed in enclosure 6 and under an air vacuum as shown in vacuum line 20. Thus, the operators and the facility are kept safe from any toxic contact of dust and fumes that are generated during the recycling process.

FIG. 2 also illustrates the HEPA vacuum cleaning cabinet (right). After the catalytic converter has been decanned, if the catalyst is wrapped with an expansion wire, the wire and the housing are pushed through opening 14 into this cleaning cabinet. An operator with a hand-operated vacuum nozzle cleans the now open catalytic converter housing and any wire wrap found. The nozzle is connected to a HEPA vacuum source 29. When the catalyst material is ground into a mixture, discharge valve 28 is opened and the pneumatic convey pump 23 is turned on. The blended material flows past valve 28 into transport line 22 and through the pneumatic pump and continues in transport line 22 up into hopper 24. The V blender 30 is rotated to the up intake position and hopper 24 is lowered and seals against hopper discharge valve 27. Once seated discharge vale 27 is opened, the now powdered catalytic material leaves hopper 24 and passes through discharge valve 27 and into the V blender. The pneumatic conveyor pump continues emptying the pulverizer until the blender is full.

Figure 3:
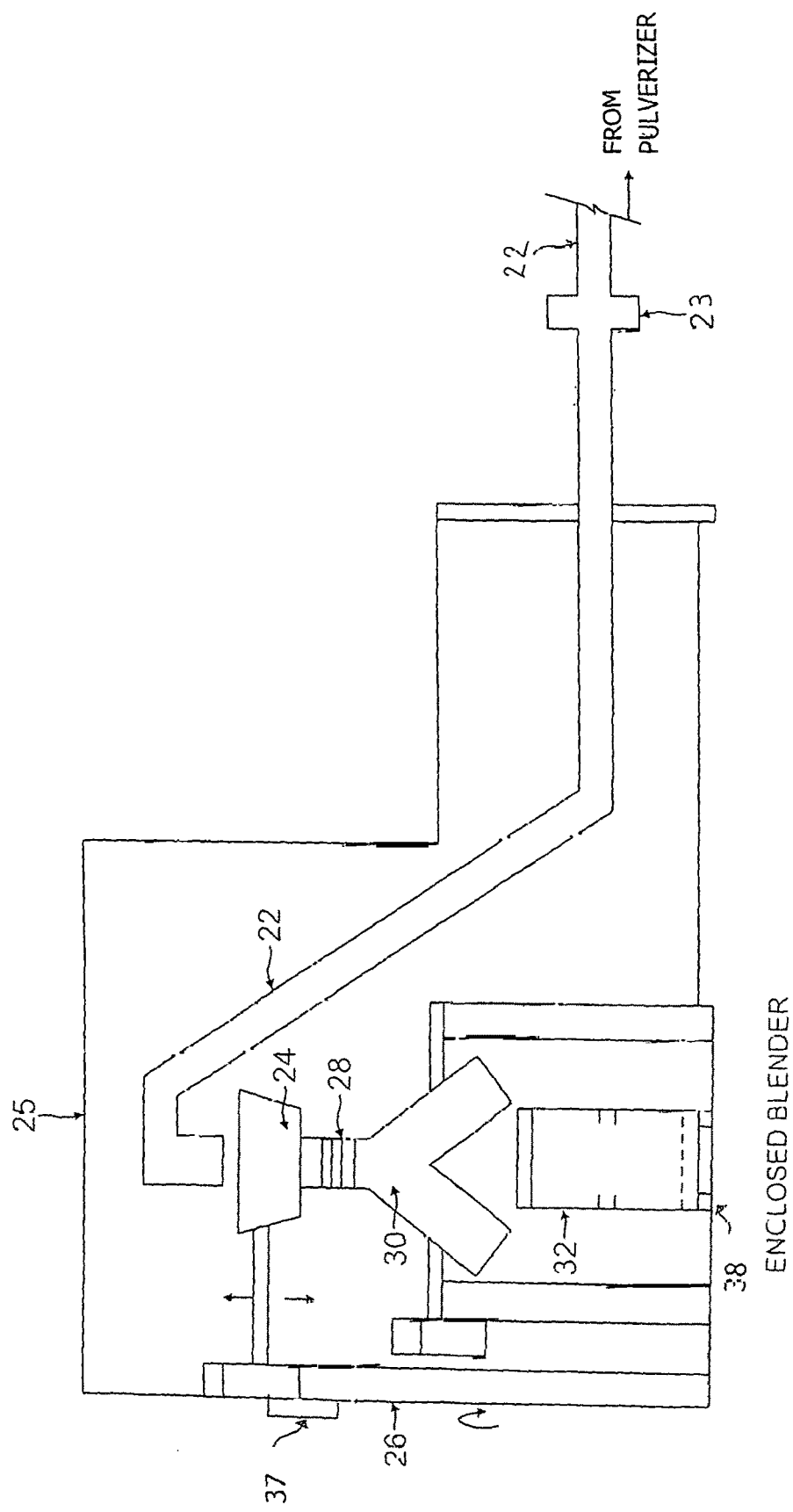
FIG. 3 is a block diagram of an implementation comprising the piping for the pneumatic conveyor from the pulverizer to the V-style blender and its hopper, the adjustable stand, and the lower discharge drum, in accordance with some embodiments disclosed herein.

Once the blender is filled to its proper level, hopper 24 is raised via hopper cylinder 37 and hopper discharge valve 27 is closed in FIG. 3. The V blender is turned on and the catalytic material is blended for the proper amount of time into a homogenous mixture. Once thoroughly blended, the blender is rotated so that its discharge valve 28 is at the low position and container 32 is raised by air jacks 38. The opening in the container meets the discharge valve 28 for a sealed connection between it and the raised container 32. Discharge valve 28 is now opened and the blended material flows out of the blender through discharge valve 28 and into container 32. When the container is full, it is sealed and can be shipped to a refiner for further processing. The entire blender 30 is housed in enclosure 25 and under a negative air vacuum. An option would be to only enclose the upper and lower receiving and discharge ends of the blender or mixer.

The full sequence of operational steps is described as follows. The sequence herein provides examples of the operation of various system components and modules, according to embodiments disclosed herein. In step 1, the scrap catalytic converter is placed on the trimming table. In step 2, the tail pipes, heat shields, and bolts are removed and placed in a container to be sent to a scrap recycler later. In step 3, the trimmed converter is placed on conveyor 5, which is in an enclosed cabinet. Cabinet door 4 is pulled down. In step 4, the operator turns on the vacuum source to start pulling air out of all the cabinets. The operator activates conveyor 5 to send the front converter on the conveyor into the cutting and decanning cabinet. In step 6, the operator inserts his hands into the attached gloves, picks up the plasma cutting gun in the cabinet, and cuts open the steel housing shell of the converter. Once sufficiently cut open, he lifts out the catalyst. In step 7, if the catalyst is wrapped with a cloth insulation, the operator places this insulation in a container already inside the cabinet to be later collected and sent to a recycler. In step 8, if the catalyst is wrapped with a wire metal mesh for insulation, it is put on a sliding tray and pushed into the cleaning cabinet on the right side of FIG. 2. In step 9, the operator also places the now cut open converter shell on the sliding tray and it too is pushed into the cleaning cabinet. In step 10, the operator places the catalyst on a sliding tray in front of him and pushes the catalytic material into the mouth of the crusher tube. In step 11, the operator now activates the crusher tube cylinder, which pushes down on an attached piston. The piston contacts the catalyst material on the top and pushes through a grate at the bottom of the crusher tube, thus pushing the material through the grate and breaking it into pieces (step 12). The pieces fall into a pulverizer connected to the bottom of the tube and the catalyst material is ground up into powder. In step 13, the pulverized material is pumped by a pneumatic conveying device up into the top of the hopper of a V type mixer. In step 14, the hopper is lowered to the inlet of the V blender and the blender is filled to a predetermined level. In step 15, the hopper is raised for clearance and the V blender turned on and rotates the powder until it becomes a homogenous mix. In step 16, while the blender is mixing the catalyst, the operator can move to the cleaning cabinet and vacuum clean the empty converter housings and any wire wrap. After the material is thoroughly cleaned with a HEPA type vacuum source, the material is moved into a container adjacent to the cleaning cabinet and later when full, shipped to a recycler. In step 17, when the blending is completed by the V blender, a container sitting on air jacks is raised a few inches to the out port of the V blender and the material is emptied into the container. The container is then sealed and ready to be shipped to a refiner who will extract the precious group metals from the mixture.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings without departing from the spirit and the scope of the description. The embodiments were chosen and described in order to best explain the principles of the invention and its practical applications, to thereby enable others skilled in the art to best utilize the invention and various embodiments with various modifications as are suited to the particular use contemplated. Alternate embodiments are also Included within the scope of the disclosure. In these alternate embodiments, functions may be executed out of order from that shown or discussed, including substantially concurrently or in reverse order, depending on the functionality involved. Not all steps are required in all embodiments. For example, several steps in the deconstruction process could be combined for equipment. The crushing in step 12 could be combined with the impact mill by using a suitable type combined crusher-pulverizer. Another alternative step would be the cleaning of dust from the catalytic converter housing. The housing could be cleaned with a washer of the conveyor or rotary enclosed type with hot spray solution onto the metal material and then hot air dried at the end of the washing or any type of suitable washer could be utilized. Another alternative step would be to substitute the pneumatic conveying pump for a different conveying method. For example, a bucket or screw type conveyor can be used to lift a bucket or hopper up to the blender/mixer. Another method is to substitute the V blender with another type, such as a cone, ribbon, or any suitable type of mixer or blender. Another modification is to enclose the catalytic converter trim table and subject it to a negative air vacuum source.

The components and modules illustrated herein are abstractions chosen to illustrate how functionality is implemented in some embodiments disclosed herein. Other combinations or divisions of functionality are also possible, and these other possibilities are intended to be within the scope of this disclosure. As will be appreciated by one of ordinary skill in the art, the methods described herein may represent one or more of any processing strategies such as event-driven, interrupt-driven, multi-tasking, multi-threading, and the like. As such, various steps or functions illustrated may be performed in the sequence illustrated, in parallel, either manually or by automation or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the specific strategy employed.

What is claimed is:

1. A system for recycling catalytic converters comprising:
    a housing;
    said housing has at least one viewable glass and at least one set of attached gloves that are sealed to said housing, and are configured for an operator to pass their hands into said housing;
    said housing including means for evacuating or generating a vacuum within said housing;
    within said housing is a plasma cutting device to open and expose an interior of a catalytic converter and at least a first tool for removing elements that are internal to said catalytic converter.

2. The system of claim 1, wherein said housing includes at least one enclosure to house the catalytic converter recycling operation to collect dust or fumes.

3. The system of claim 1, wherein said housing has a negative air vacuum source to draw air through a filter for dust collection.

4. The system of claim 1, wherein said housing has an adjustable hopper stand located over a blender to mix catalytic material into a homogeneous mixture.

5. The system of claim 1 that further includes a method for recycling catalytic converters which includes introducing an empty catalytic converter to a piston of a tube crusher to push the catalytic material through a grate into a pulverizer.

6. The system and method of claim 5 that further includes a method for separating at least two of a catalyst carrier, an insulating wrap cloth, a wire mesh, and a metal converter housing.

7. The system and method of claim 6 that further includes a method for treating metal material by vacuuming, and washing to provide contaminant-free scrap material for a recycler.

8. The system and method of claim 7 that further includes a method to separate a catalyst and a carrier from the housing and washing scrap metal before shipping to a recycler or a refiner.

9. The system of claim 1, wherein said housing includes a conveyor system.

10. The system of claim 9, wherein conveyor system is activated by a switch or control button.

11. The system of claim 10, wherein switch or control button is operable by a foot of an operator.

12. The system of claim 1, wherein said housing includes at least one bin for a group consisting of a catalyst carrier, an insulating wrap cloth, a wire mesh, and a metal converter housing.

13. The system of claim 1, further includes at least one sliding tray for storage of separated elements.

14. The system of claim 12, further includes a HEPA vacuum cleaning cabinet.

15. The system of claim 14, wherein said metal converter housing is forced through a grate.

16. The system of claim 15, wherein said metal converter is processed through a pulverizer.

17. The system of claim 16, wherein said pulverizer is a knife or a chain.

18. The system of claim 16, wherein pulverized material is further ground into a powder of blended material.

19. The system of claim 18, wherein said blended material is transported with a pneumatic pump, a bucket or a screw conveyor to a hopper.

20. The system of claim 19, wherein said hopper is sealed for transportation before leaving said HEPA vacuum cleaning cabinet.

* * * * *